United States Patent [19]
Tilley

[11] 3,708,668
[45] Jan. 2, 1973

[54] VEHICLE OPTICAL GUIDANCE SYSTEM

[76] Inventor: James W. Tilley, Lewis House, 2412 Pierce Avenue, Apt. 603E, Nashville, Tenn. 37212

[22] Filed: June 1, 1971

[21] Appl. No.: 148,584

[52] U.S. Cl. ................................. 250/202, 180/98
[51] Int. Cl. .............................................. G05b 1/00
[58] Field of Search ........ 250/202, 220, 208; 180/97, 180/98

[56] References Cited

UNITED STATES PATENTS 3,353,619  11/1967  Lambert ............................. 180/98

*Primary Examiner*—Archie R. Borchelt
*Assistant Examiner*—D. C. Nelms
*Attorney*—Harrington A. Lackey

[57] ABSTRACT

A guidance system for a motor vehicle having a steering system including a plurality of photoelectric elements viewing an elongated strip transversely of the broken center line of a road; electronic circuitry including position-registers for receiving the input signal generated by the photoelectric elements and for producing output position signals corresponding to the new and old positions of the vehicle relative to the line; a comparator circuit for comparing the position signals to produce a control signal; and a control mechanism responsive to the control signal to restore the direction of the motor vehicle to a true course relative to the center line.

10 Claims, 4 Drawing Figures

PATENTED JAN 2 1973 3,708,668

INVENTOR
JAMES W. TILLEY
BY Harrington A. Lackey
ATTORNEY

VEHICLE OPTICAL GUIDANCE SYSTEM

BACKGROUND OF THE INVENTION

This invention relates to an electronic guidance system, and more particularly to a system for guiding a motor vehicle relative to a broken directional line.

Automatic guidance systems to maintain motor vehicles on a true course are known in the art. Moreover, the use of a bank of photoelectric cells for sensing s directional line of different light reflectivity than the road surface to restore the vehicle to its true course, is also known.

However, it is not believed that the prior art includes any vehicle guidance systems for sensing a broken or interrupted directional line. Moreover, it is not believed that there are any prior guidance systems which sense and compare, not only the position of the vehicle with respect to the broken line at any instant, but also the lateral rate of change of the vehicle's position, that is the lateral velocity of the vehicle, relative to the broken line at any one instant.

SUMMARY OF THE INVENTION

It is therefore an object of this invention to provide an automatic electronic vehicle guidance system incorporating an optical sensing means for continuously sensing or detecting the interruptions or breaks in a broken directional line, more specifically, the broken center line of a road.

Furthermore, it is an object of this invention to provide a vehicle guidance system in which not only the position, but also the lateral velocity, of a vehicle at any one instant is detected, recorded and compared, to produce a control signal which is reliable in restoring the vehicle to its original true course relative to the broken directional line.

The guidance system made in accordance with this invention includes a plurality of photoelectric elements which view contiguous areas disposed in a strip transversely of the broken center line of a road or highway. Preferably, the center photoelectric element in the bank normally views the center line. Operatively associated with each view photoelectric element is a compensating photoelectric element for viewing portions of the road surface which do not include the broken center line. The purpose of the compensating photoelectric element is to prevent false signals from changes in the reflectivity of the road surface per se, and to produce a signal only when interruptions in the broken center line are viewed by the view photoelectric element.

The signal generated by a photoelectric element viewing an interruption in the center line is amplified to energize a monostable multivibrator and produce a high-level voltage signal for a predetermined period of time. The highlevel voltage signal from the multivibrator is transmitted to a first, or new-position, register for storage, and is also transmitted to a timing circuit which actuates a second, or old-position, register which receives information previously stored in the first register. Output signals from the position registers are added and compared to produce a control signal corresponding to the position and lateral velocity of the vehicle relative to the broken center line. The control signal then energizes a control mechanism, such as steering apparatus, for restoring the vehicle to its original true course.

There is a new-position register unit and an old-position register unit for each photoelectric element. The actuated new-position register unit records where the vehicle is at the moment, while the old-position register unit records where the vehicle was at the next preceeding break in the broken line. Thus, by comparing the signals indicating where the vehicle is now, and where it was one break before, both the position and the lateral velocity of the vehicle may be constantly computed and compared to produce the necessary control signal for restoring the vehicle to its true course.

DESCRIPTION OF THE PREFERRED EMBODIMENT

Figure 1:
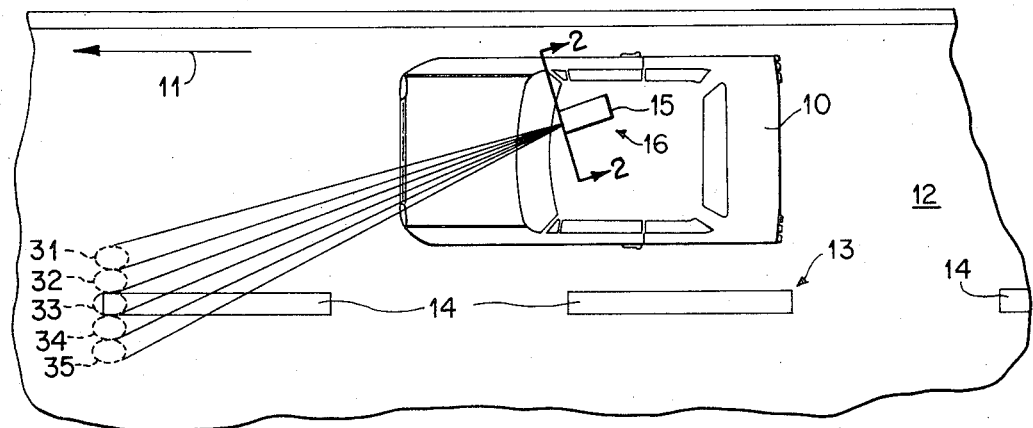
FIG. 1 is a schematic top plan view of a motor vehicle incorporating the system made in accordance with this invention for guiding the vehicle along a road parallel to a broken center line.

Referring now to the drawings in more detail, FIG. 1 discloses a motor vehicle, such as an automobile 10, moving in the direction indicated by the arrow 11 along a true course in the right-hand lane of a road surface 12, defined by the broken center line 13 composed of longitudinally spaced elongated segments 14. Typically, the segments 14 are white, or in any event more light-reflective than the remainder of the road surface 12.

Mounted in any convenient fixed position upon the vehicle 10 is the chassis or housing 15 of the vehicle guide system 16. The chassis 15 is mounted at an angle to the longitudinal axis of the vehicle 10 so that it is directed toward the center line 13.

Figure 2:
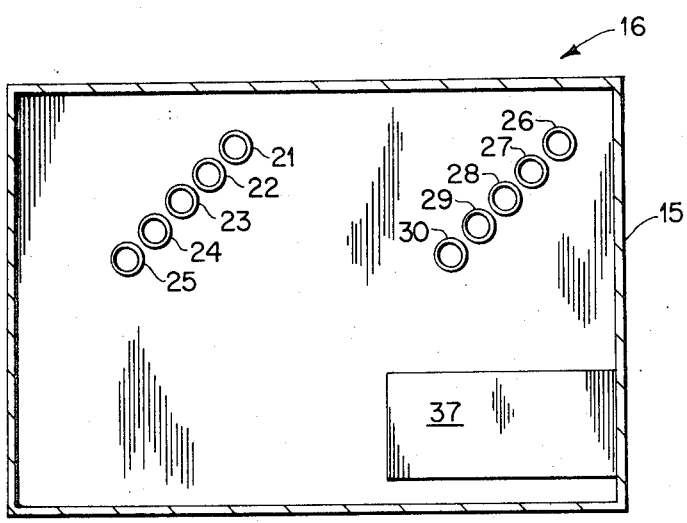
FIG. 2 is an enlarged section taken along the line 2—2 of FIG. 1 disclosing the banks of view photoelectric cells and compensating photoelectric cells.

As best disclosed in FIG. 2, mounted on the back wall of the chassis 15 is a bank, or plurality, of view photoelectric elements or photocells 21, 22, 23, 24 and 25. Also mounted on the back wall of the chassis 15 are an equal number of corresponding compensating photoelectric elements or photocells 26, 27, 28, 29 and 30.

When the vehicle 10 is moving along its normal course 11, the view photocells 21 – 25 are so directed that they intercept respective view areas 31, 32, 33, 34 and 35 upon the road surface 12. The view areas 31 – 35 are consecutively contiguous and transversely span the center line 13.

Preferably, the chassis 15 is mounted so that the middle view photocell, that is, the third photocell 23 in the bank of five, is directed so that its view area 33 normally intercepts the light-reflective segments 14 in the center line 13. Thus, there are equal numbers of view photocells, 31 and 32, and 33 and 35, on opposite sides of the center line 13, for viewing the center line 13 when the vehicle 10 varies from its course 11 in either lateral direction.

The compensating photocells 26 – 30 are directed toward the road surface 12 in any area in which the compensating photocells 26 – 30 will not view the center line segments 14.

All of the view photoelectric cells 21 – 25 and compensating photocells 26 – 30 are preferably identical to each other and produce the same signal for the same light input.

The casing 37 in chassis 15 houses many of the electrical and electronic components of the system 16 (FIG. 2).

Figure 3:
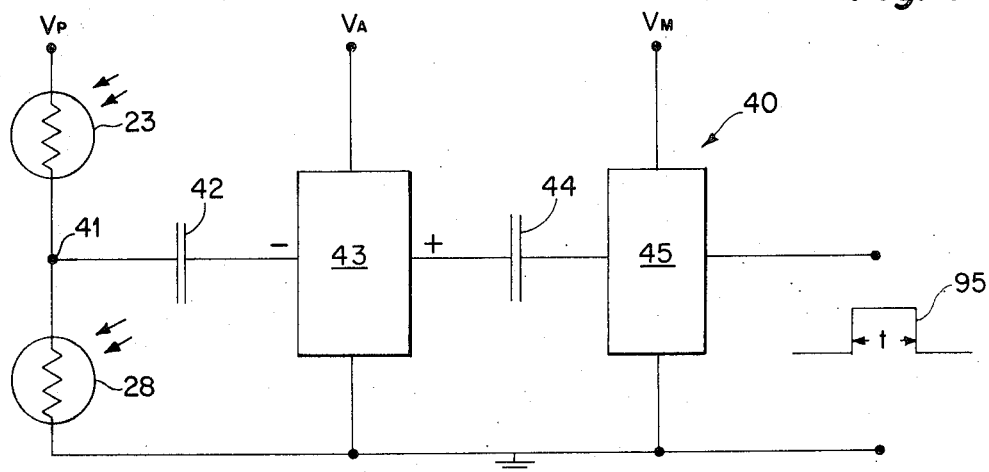
FIG. 3 is a circuit diagram of one optical unit.

Each pair of corresponding photocells, such as the center cells 23 and 28, are connected together in the optical electrical unit or circuit 40 (FIG. 3). Thus, as long as the photocell 23 and photocell 28 are viewing the same road surface having the same light reflectivity, their output voltages are equal and opposite so that no voltage or signal will be generated at node or junction 41. However, once the view area 33 is intercepted by the light reflective segment 14, then the voltage produced by compensating photocell 28 is greater than that produced by the photocell 23 so that a new differential volage appears at the node 41. This signal is transmitted through the capacitor 42 to amplifier 43 which has a widely adjustable gain. The amplifier 43 also inverts the signal. The inverted, amplified signal is then transmitted through the capacitor 44 to a monostable multivibrator 45.

In the particular system 16, the characteristics and values of the amplifier 43 and monostable multivibrator 45 are such that only the signal generated when the view area 33 leaves the trailing end of the segment 14, in other words passes from a light area to a dark area, can be used to activate the monostable multivibrator 45. Optionally, the system 16 could be adapted to sense the leading end of segment 14. As the view area 33 leaves the trailing edge of a segment 14, a negative input signal is introduced to the amplifier 43. Upon inversion, the signal is not only amplified, but is made positive at the output of the amplifier 43. As the output signal of amplifier 43 becomes sharply more positive, it attains a value sufficient to trigger, or turn on, the monostable multivibrator for a predetermined time period $t$ (FIG. 3), which is determined by the internal construction and circuitry of the multivibrator 45. The time $t$ must be slightly greater than the total time required to store the position representation in the electronic system 16.

Capacitor 42 blocks the direct current component of the signal produced by the photocell pair 23 and 28. Capacitor 44 is provided to prevent the direct current drift of the output of the amplifier 43 from biasing the multivibrator 45 closer to its turn on value.

Figure 4:
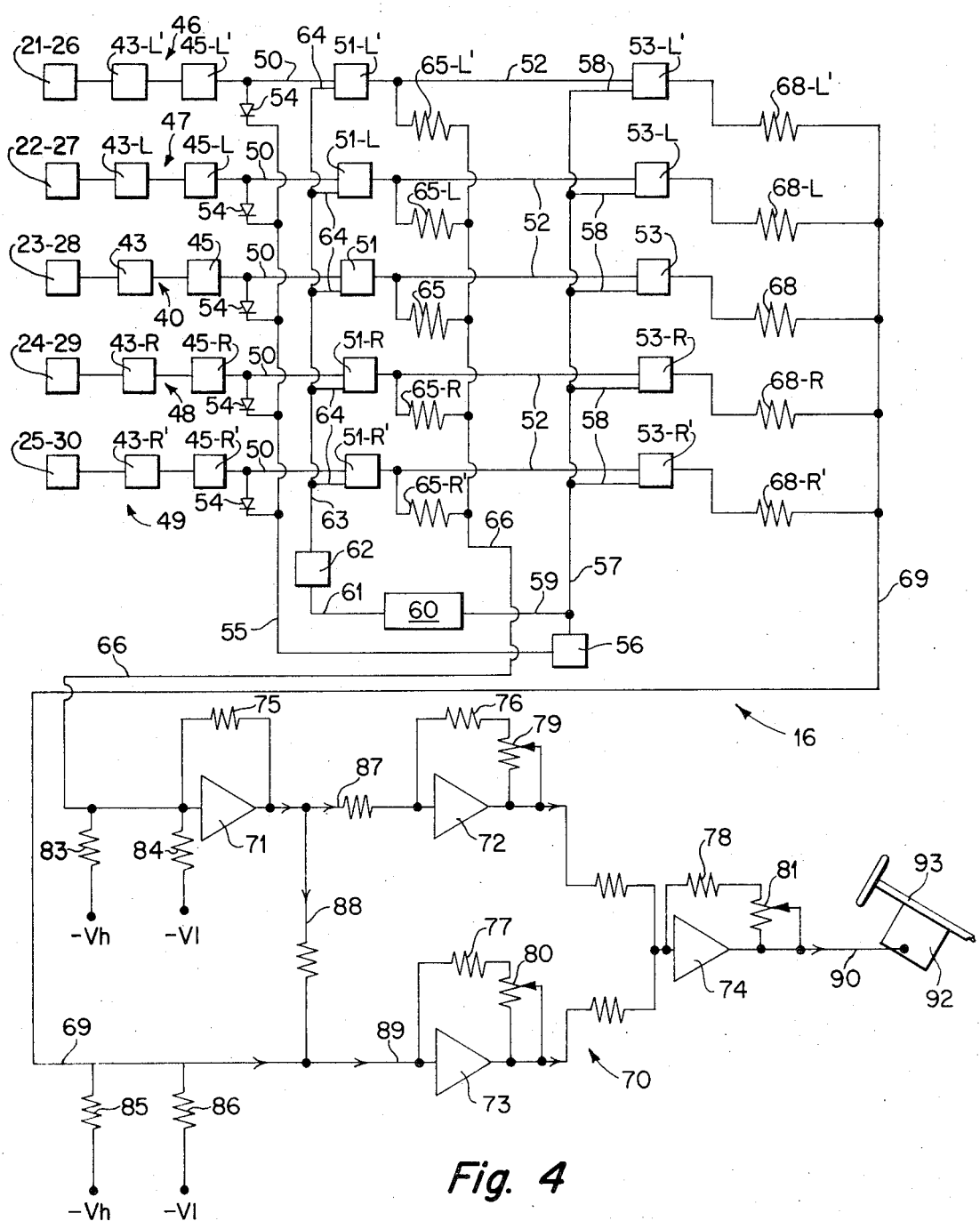
FIG. 4 is a schematic diagram of the entire circuitry of the system.

Although any desired number of optical units may be employed, five of these units, including the center unit 40 and four other optical units 46, 47, 48 and 49, are disclosed in FIG. 4. Each optical unit 46 – 49 has the identical components as the optical unit 40, that is, a pair of view and compensating photocells 21 – 26, 22 – 27, 24 – 29 and 25 – 30; an optical signal inversion amplifier, 43 – L', 43 – L, 43 – R, 43 – R'; and a monostable multivibrator, 45 – L', 45 – L, 45 – R and 45 – R'.

The output lead 50 from the monostable multivibrator 45 in each optical unit 40, 46 – 49 is connected to the input of corresponding first, or new-position, register units 51 – L', 51 – L, 51, 51 – R and 51– R'. The outputs from the new-position registers 51 in turn are transmitted through leads 52 to the second, or old-position, inputs of register 53 – L', 53 – L, 53, 53 – R and 53 – R', respectively. All of the register units 51 and 53 are identical in construction, characteristics and value, and are preferably type D flip-flops.

The outputs of optical units 40 and 46 – 49 are also transmitted through diodes 54 to a common timer input lead 55. The lead 55 is connected to the input of a first timer unit 56, of any conventional construction and circuitry.

The function of each register is to preserve at its output the value appearing at its input after it has been signalled to store the input.

An output signal from the center optical unit 40 through the timer input line 55 is transmitted to the input of the timer unit 56. The transmitted optical signal turns on timer unit 56 to produce a short, positive pulse. The short, positive pulse is transmitted through line 57 and branch bias leads 58 to bias each old-position register unit 53 into a condition for receiving and storing a position output signal through line 52 from a corresponding new-position register 51.

The short, positive pulse from the output of the timer unit 56 is also transmitted through lead 59 to an inverter 60, of conventional circuitry. As the short, positive pulse from the output of the timer unit 56 drops rapidly, the inverter 60 is actuated to produce a positively rising output voltage transmitted through lead 61 to turn on a second timer unit 62. The second timer unit 62 in turn produces a short, positive pulse, which is transmitted through common output lead 63 to the branch bias leads 64 to activate the new-position registers 51 for reception of an output optical signal transmitted through line 50.

The output of a new-position register 51 is not only transmitted through lead 52, but is also transmitted through a corresponding resistor 65 – L', 65 – L, 65, 65 – R, or 65 – R; to a common new-position output line 66.

In a similar manner, any output signal from an old-position register unit 53 is transmitted through a corresponding resistor 68 – L', 68 – L, 68, 68 – R, or 68 – R', to a common old-position output line 69.

Each new-position output resistor 65 is of a different value from any other new-position output resistor, and any old-position output resistor 68 is of a different value from any other old-position output resistor, so that the output voltage from any one of the new-position registers 51 or the old-position registers 53 will be different.

New-position signals appearing in the new-position output line 66, and old-position signals appearing in the output line 69 are fed to a comparator circuit 70 including operational amplifiers 71, 72, 73 and 74. Each operational ampoifier 71 – 74 is designed to perform the standard mathematical operations of addition, subtraction, multiplication and division.

New-position output line 66 is connected to the input of operational amplifier 71, while old-position output line 69 is connected to the input of operational amplifier 73. Each operational amplifier 71 – 74 is provided with a feedback resistor 75, 76, 77 and 78, respectively. Each of the feedback circuits for the operational amplifiers 72, 73 and 74 are provided with potentiometers 79, 80 and 81, respectively, for varying the amplitude of the respective output signals. The operational amplifier 71 has a gain of −1, so that the new-position output signal is merely inverted by the operational amplifier 71. Resistors 83 and 84 provide input current bias for the operational amplifier 71 so that its output voltage will have a range of values centered at zero volts. The value of resistor 83 is equal to the output center resistor 65. The voltage $-V_h$ impressed upon the resistor 83 is equal to the turn-off voltage for each of the multivibrators 45, whereas the voltage $-V_1$ impressed upon the resistor 84 is equal to the turn-off voltage of the multivibrators 45.

The turn-on voltage $-V_h$ and the turn-off voltage $-V_1$ are also impressed through the resistors 85 and 86 upon the signal transmitted through the old-position output line 69, before being received by the operational amplifier 73. The output of operational amplifier 71 is transmitted through resistor 87 to operational amplifier 72, where the inverted new-position output signal is amplified. The output signal from operational amplifier 71 is also transmitted through line 88 to old-position output line 69, so that both the old-position output signal and the inverted new-position output signal are transmitted through lead 89 to be added in the operational amplifier 73. The amplified output positional signal is transmitted from operational amplifier 72 to the summing operational amplifier 74. The summing operational amplifier 74 also receives a velocity signal, which is the amplified output of the combined new and old position signals, from the amplifier 73.

The output of summing operational amplifier 74 is a control signal which is a function of both the new-position output signal from the registers 51 and the old-position signal from the registers 53. The control signal is then transmitted through the output line 90 to a steering control mechanism 92 for rotating the steering column 93 in the desired direction to restore the vehicle 10 to its true course 11.

In the operation of the system 16, the chassis 15 is mounted on the vehicle 10, as shown in FIG. 1, and the system is energized. As the vehicle 10 proceeds along its true course 11, substantially parallel to the center line 13, the chassis 15 is so directed that the view area 33 of center photoelectric cell 23 intercepts the segments 14 of the center line 13 continuously, as long as the vehicle remains on its true course 11. The diameter of each photocell 21 – 25 should be only large enough that the width of its image or viewing area 33 will be no wider than the width of the center segment 14. Moreover, the spacing between the photoelectric cells 21 – 25 should not be greater than the width of the image of the segments 14. However, the spacing of the photoelectric cells 21 – 25 may be less. As disclosed in FIG. 1, the view areas 31 – 35 are shown contiguous to each other, although there may be spacing between them not greater than the width of any view area.

As previously mentioned, none of the compensating cells 26 – 30 will view any portion of the center line 13. The compensating cells 26 – 30 permit the optical unit 40 to function efficiently when viewing the road surface 12 and center segments 14 in bright daylight or in dim light, such as produced in the early morning or late evening. Moreover, the compensating photocells 26 – 30 permit the optical unit 40 to function equally well on a very dark road surface, such as new asphalt, or upon a white or bright concrete-type pavement.

As long as the vehicle 10 remains on its true course 11, only the monostable multivibrator 45 of the center optical unit 40 will be turned on for the time period $t$ each time the center photoelectric cell 23 views the trailing or forward edge of the white segment 14.

Assuming that the vehicle 10 has just started on its true course 11, the center multivibrator 45 will be turned on by the reflection of the first white segment. The optical signal produced by the multivibrator 45 is then transmitted through its corresponding diode 54 to the timer input line 55. Accordingly, the first timer unit 56 is turned on, transmitting the short impulse through line 57 to all the branch leads 58 to bias each old-position register unit 53 into a receptive condition. However, since no output signals are produced by any of the new-position register units 51, then there will be no input signal for any of the old-position registers 53, and accordingly no output signal will be transmitted through the line 69 to the comparator 70.

As the value of the short, positive output pulse timer unit 56 drops, the inverter 60 is actuated to produce a rising positive output signal through line 61 to the second timer unit 62. Timer unit 62 is then actuated to also produce a short, positive pulse which is fed through line 63 to all of the branch biasing leads 64 to actuate the new-position registers 51 into a receptive condition. Since the only multivibrator which is turned on at this instant is center multivibrator 45, then its output signal is received and stored in the center new-position register 51. However, at the instant when the center register 51 is producing an output signal for the line 52, the old-position registers 53 have already been turned off. After both old-position registers 53 and new-position registers 51 have been progressively turned on and off, then the multivibrator 45 will turn off. In other words, the time $t$ (FIG. 3) must be at least as great as, and preferably at least 50 percent greater than, the total on-times of timer units 56 and 62. During the time $t$, while the registers 51 and 53 are storing information, the steering mechanism 92 is not permitted to respond to the control signal from summing operational amplifier 74.

Although the output signal from the information stored in the center new-position register 51 is not at the moment transmitted through the line 52 to the center old-position register 53, nevertheless it does pass through its output resistor 65 and through the output line 66 to the operational amplifier 71. However, since the comparator circuit 70 generates only a positional signal from the center new-position register 51, and no velocity signal at all, the steering mechanisms 92 and 93 will remain unchanged.

After the vehicle 10 has moved a distance equal to the spacing between the segments 14, the center optical unit 40 will again be energized to activate the center monostable multivibrator 45 to turn on for the second time. Again, the first timer unit 56 is energized to turn on the old-position registers 53. However, this time, the center old-position register 53 will pick up the output signal from the new-position register 51 developed by the originally stored information. Subsequently, all the old-position registers 53 will be turned off with the first position signal stored in the old-position register 53, so that an output signal will appear in the old-position output line 69. Again, the inverter 60 is energized to turn on the timer 62 and again turn on all of the new-position registers 51. The new-position register 51 will receive and store the second position signal from the multivibrator 45.

At this time, the information stored in old-position register 53 is the first position signal registered, while the information stored in the center new-position register 51 is the second position signal developed by the optical unit 40.

The second position signal is transmitted through the line 66 to the amplifier 71, while the first position signal is transmitted through line 69 to amplifier 73. The inverted second position signal is transmitted from operational amplifier 71 through lead 88 and combined with the first position signal in the line 89 where both are added and amplified in the operational amplifier 73. Then the output positional and velocity signals from amplifier 72 and 73, respectively, are combined in the summing amplifier 74 to produce a control signal in the line 90. Here again, because both the velocity and positional signals originated from the respective center registers 53 and 51, actually no control signal will be developed of sufficient value to actuate the steering mechanisms 92 and 93.

Now assuming that the vehicle 10 veers to the right, that is, proceeds at an angle to the right or the true course 11, by an amount such that the next or third center segment 14 will be intercepted by the view area 34, then the center line image will be received by the view photocell 24. Accordingly, the optical unit 48 will be energized to turn on the multivibrator 45 – R. The optical output signal will then be transmitted through the timer input line 55 to turn on the timer 56 and activate all the old-position registers 53. At this instant, only the center old-position register 53 will pick up the position information stored by the previous reception in the center new-position register 51. After the old-position registers 53 are turned off, the invertor 60 and second timer unit 62 will turn on the new-position registers 51. However, only the new-position register 51 – R will receive the signal from the turned-on multivibrator 45 – R.

At this point in time, information is stored in the old-position register 53 and the new-position register 51 – R. Accordingly, an old-position signal is generated in proportion to the resistor 68 and transmitted through the output line 69 to the comparator 70. Also, a new-position signal is generated in proportion to the value of the resistor 65 – R and transmitted through the output line 66 to the comparator 70. In a manner previously described, the operation amplifiers 71, 72 and 73 receive, invert, amplify and add the respective new-position and old-position signals to produce output positional and velocity signals, which are again added and amplified in the operational summing amplifier 74. Under these circumstances, a control signal is produced and transmitted through the line 90 to energize control mechanism 92 to turn the steering column 93 to the left to a degree determined by the strength of the control signal, so that the vehicle 10 will be restored to its true course 11.

This process continues as the image of each successive white segment line 14 is received in a view photoelectric cell 21 – 25. This information will be stored in the corresponding new-position register 51, immediately after an old-position register 53 receives information previously stored in its corresponding new-position register 51. The storage operations in the position registers 51 and 53 will be completed within the time $t$, which is the turn-on time for any one of the multivibrators 45.

Of course, the control signal developed in the output signal line 90 is greater when the new information stored in a new-position register 51 is two rows away from the old-position register 53 storing the previous information, for example, than when the fresh information is stored in the new-position register in the adjacent row. For example, the control signal will be greater at any instant in which the old-position register 53 produces an output signal and the new-position register 51 – L' produce an output signal, than when the old-position register 53 and new-position register 51 – L are producing the simultaneous output signals.

It will also be understood that more than the five disclosed optical units 40, 46 – 49 can be, and probably would be, used in order to provide a more comprehensive and reliable guidance system.

It will be seen, that the signal transmitted from the output line 66 is representative of the position of the vehicle 10 with respect to the center line 13 at any given instant, while the output signal transmitted through the line 69 is representative of the old position of the vehicle 10 relative to the center line 13. The velocity signal is produced by registering and measuring the difference between the signals stored in the old-position register and the new-position register at any instant of time.

It will also be understood that the control signal in the line 90 could be used to actuate a mechanism other than the steering control mechanisms 92 and 93. For example, the control signal 90 could be used to visually indicate to the driver of the vehicle 10 the position and degree of lateral deviation of the vehicle at any instant. Such a visible signal could be in the form of a light, a scribing instrument or any other type of visible indicator.

It will also be understood that regardless of the number of rows, there can be only one signal stored in any one of the new-position registers 51 and there can be only one signal received and stored in any one of the old-position registers 53, at one time.

What is claimed is:

1. A guidance system for a vehicle adapted to travel on a road having a visible, broken directional line, comprising:
   a. photoelectric means adapted to sense said directional line and to produce an electrical input signal corresponding to an interruption in the broken line viewed by said photoelectric means,
   b. first registering means adapted to be actuated by said input signal to produce a first output signal corresponding to the position of the vehicle relative to the broken line,
   c. second registering means adapted to be actuated by said input signal to produce a second output signal corresponding to the next previously produced first output signal to register the immediate past position of the vehicle relative to the broken line,
   d. means for comparing said first and second output signals to produce a control signal, and e. control means responsive to said control signal for maintaining said vehicle on a true course relative to said broken line.

2. The invention according to claim 1 in which said photoelectric means comprises a plurality of photoelectric elements mounted on the vehicle to view contiguous areas of the road disposed transversely of the directional line, so that only one element at a time views said directional line.

3. The invention according to claim 2 in which each photoelectric element comprises a view photoelectric element and further comprises a compensating photoelectric element operatively connected to each view photoelectric element to view the surface of the road not including a broken line, so that an input signal is produced only by the difference in light viewed by a view photoelectric element and its corresponding compensating photoelectric element.

4. The invention according to claim 2 in which said first registering means comprises a first register unit for each photoelectric element and said second registering means comprises a second register unit for each photoelectric element, said first register unit being adapted to receive the input signal from a corresponding photoelectric element, each second register unit being adapted to receive an output signal from a corresponding first register unit upon actuation by an input signal subsequent to the actuation of said corresponding first register unit by a previously produced input signal.

5. The invention according to claim 4 further comprising timing means responsive to said input signals for actuating said first and second register units.

6. The invention according to claim 5 in which said timing means is energized by an input signal to first actuate said second register units to receive any output signal from said corresponding first register units, and subsequently to actuate said first register units to receive any input signals from a corresponding photoelectric element.

7. The invention according to claim 2 in which said photoelectric means further comprises an amplifier and a monostable multivibrator connected in series with each of said photoelectric elements to produce said input signal when said photoelectric element views an interruption in said broken line, each of said monostable multivibrators being connected to said first registering means and to said second registering means.

8. The invention according to claim 7 in which said monostable multivibrator is turned on by a predetermined voltage generated by a photoelectric element viewing an interruption in said broken directional line, said monostable multivibrator remaining turned on for a period of time greater than the combined time for actuating said first registering means and said second registering means.

9. The invention according to claim 1 in which said comparing means comprises amplifier means for adding and comparing said first and second output signals.

10. The invention according to claim 9 in which said amplifier means comprises a first operational amplifier for receiving said first output signal, a second operational amplifier for amplifying said first output signal, a third operational amplifier for receiving and adding said second output signal and the output signal from said first amplifier, and a fourth operational amplifier for receiving and adding the output signals from said second and third amplifiers.

* * * * *